United States Patent [19]

Blaschek et al.

[11] Patent Number: 5,106,185
[45] Date of Patent: Apr. 21, 1992

[54] CONTROL AND REGULATING DEVICE FOR FILM TRANSPORT IN A FILM PROJECTOR

[75] Inventors: Otto Blaschek, Aschheim, Fed. Rep. of Germany; Ernst Tschida; Josef Haas, both of Vienna, Austria; Thomas Popp, Munich, Fed. Rep. of Germany

[73] Assignees: Arnold & Richter Cine Technik GmbH & Co., Munich, Fed. Rep. of Germany; Betriebs KG and Arri Cine & Video Gerate Gesellschaft M.B.H., Vienna, Austria

[21] Appl. No.: 571,657
[22] PCT Filed: Mar. 9, 1989
[86] PCT No.: PCT/DE89/00158
§ 371 Date: Oct. 26, 1990
§ 102(e) Date: Oct. 26, 1990
[87] PCT Pub. No.: WO89/08867
PCT Pub. Date: Sep. 21, 1989

[30] Foreign Application Priority Data

Mar. 11, 1988 [DE] Fed. Rep. of Germany ....... 3808107

[51] Int. Cl.$^5$ ............................................. G03B 21/48
[52] U.S. Cl. ........................................ 352/180; 352/14
[58] Field of Search ................... 352/14, 180, 181, 182

[56] References Cited

U.S. PATENT DOCUMENTS

| | | | |
|---|---|---|---|
| 3,565,521 | 2/1971 | Bulter et al. | 352/180 |
| 4,150,886 | 4/1979 | Merkel et al. | 352/14 |
| 4,245,897 | 1/1981 | Beauviala et al. | 352/14 |
| 4,312,576 | 1/1982 | DeJeney | 352/14 |

Primary Examiner—Monroe H. Hayes
Attorney, Agent, or Firm—Fish & Richardson

[57] ABSTRACT

Control and regulating device for film transport in a film projector, with winding plates (62, 72) located on both sides of a film gate (8) and drivable by a single motor (61, 71), and with supply and takeup devices (3, 4) likewise disposed between the winding plates (62, 72) and film gate (8), the devices being drivable by at least one drive motor (51) to produce film loops on both side of the film gate (8) and with a transport device (2) between the supply and takeup devices (3 and 4). The drive motors (21; 51; 61, 71) for the winding plates (62 and 72), supply and takeup devices (3 and 4), and film transport device (2) are connected with sensors (25; 55; 65, 75) to detect the rpm and/or rotational direction, so that when a presettable rpm is exceeded or when one of the drive motors (21; 51; 61, 71) rotates in a rotational direction counter to the rotational direction predetermined by a higher-order operating control, all drive motors (21; 51; 61, 71) are braked simultaneously.

10 Claims, 4 Drawing Sheets

CONTROL AND REGULATING DEVICE FOR FILM TRANSPORT IN A FILM PROJECTOR

The invention relates to a control and regulating device for film transport in a film projector.

A control device for the film transport in a film projector is known from DE-PS 27 38 322. The known projector has two film reels, one on each side of the film gate and drivable by its own reel motor, two friction roller pairs, driven separately from one another and located between the reels and the gate to produce film loops on both sides of the gate, and a film transport device between the two friction roller pairs for intermittent transport of the film through the gate.

The control device includes one loop-measuring device between each friction roller pair and the gate, and a friction roller pair control circuit which obtains a measurement signal from the loop-measuring device associated with it and delivers an output signal to the drive motor of the associated friction roller pair to maintain a constant film loop size A circuit is also provided which delivers a signal corresponding to the frame frequency, to the film transport device and to the friction roller control circuits to permit operation at a frame frequency settable in advance and variable within a wide range, while maintaining constant film loop sizes on both sides of the gate. In addition, a signal derived from the output signal of the friction roller control circuits is fed to the reel motor control circuits for the reel motors to produce a constant film tension between the friction rollers and the reels.

The control circuits for the drive motors of the supply and takeup devices and for the reel motors as well as the loop sensors are coupled together in such fashion that the film is unwound from the supply reel while maintaining a constant film loop and with an essentially constant tension, and wound on the takeup reel. A precondition for this, however, is that the film be placed in an exactly specified manner in the film channel and positioned on the winding plates so that, as the film is transported in one direction or the other, it will be correctly unwound and wound, and the film will not be damaged or torn because the film reels were incorrectly mounted.

For rapid winding from one reel to the other, the known control device has a fast transport control with dynamic braking that operates only during simple rewinding, while when the film is completely unwound from one of the winding plates, both winding plates are driven again so that the free film end projecting out of the film reel strikes the parts of the film projector arranged at the periphery of the winding plate in question.

An effective runout stop, both during intermittent film transport and during continuous film transport for searching or for fast forward or reverse winding, however, not only increases the ease of operation but is also a requirement for installing remote control and for using a film projector of this kind for film editing.

Since the known control device also has separate drives for the friction roller pairs and separate measuring devices for the film loops formed to the right and left of the film gate, and therefore necessarily has separate friction roller control circuits, it is relatively expensive and moreover cannot be switched, for rapid frame transport, from intermittent film transport to continuous film transport.

The goal of the present invention is to provide a control and regulating device, for film transport in a film projector that permits a direct transition from intermittent frame transport at any possible frame presentation frequency, to continuous fast forward and reverse, and creates the necessary conditions for simply placing the film on the winding plates and permitting an effective runout stop of the film both during intermittent film transport and during fast forward or reverse or in the search mode.

The solution according to the invention makes it possible by providing only one common motor for the supply and takeup devices, to have simplified control and regulation of the film drives both during intermittent film transport according to a given transport pattern, with a freely selectable frame frequency, and a continuous film transport for the fast forward, fast rewind, and search modes, and permits the film to be simply placed on the winding plate so that it may optionally be wound internally or externally. In this manner, operating comfort is considerably increased and necessary conditions created for user-friendly remote control and film editing.

The transitional phase, in which the projection speed and angular velocity change, produces a rapid yet continuous change in the rpm of the supply and takeup devices and hence in the film speed. In this way, correct film tension on the film reels and/or winding plates is ensured even in the transitional phases. By coupling the two supply and takeup devices, only one drive motor is required for the supply and takeup devices as well as one loop-measuring device and one control and regulating device for the supply and takeup devices.

Hence, the invention proposes a fast-winding device for film transport in a film projector, characterized by low cost and high user comfort, whereby the operator, by pressing only one control button, can switch immediately from any film projection speed to fast forward, in other words from stepwise frame transport immediately to continuous frame transport and back again to the desired frame projection frequency. The higher-order control, regulating, and monitoring system automatically adds the necessary transitional phases.

In the solution according to the invention, film supply loops are provided for uncoupling the film reels resting on the winding plates from the stepwise film advance movement in the vicinity of the gate on both sides of the gate, said loops being guided over two sprockets of the supply and takeup devices and held thereby, with the drive for the supply and takeup devices being provided through belts by a common DC motor whose rpm is regulated proportionally to the set image frequency.

Once adjusted, the loops remain essentially constant, with any deviations being detected by a loop-measuring device in the form of a reflective light barrier and fed to the drive regulator for the common DC motor. By coupling the two supply and takeup sprockets, only one drive motor, one loop-measuring device, and one drive regulating device are required.

To switch the frame frequency, a higher-order control, regulating, and monitoring system adds a transitional phase to produce a rapid yet continuous change in the rpm of the supply and takeup devices and hence in the film speed. In this manner, and by adding an additional acceleration torque suitable for the winding diameter, correct film tension is ensured on the film reels even in the transitional phases. The film loop regulation is supplied during this transitional phase to the film transport device, said device, depending upon the output signal from the loop-measuring device, adding or subtracting film transport steps.

According to one advantageous improvement of the invention, with continuous film transport, a bias voltage proportional to the rpm of the supply and takeup devices is applied during continuous film transport to the film transport device and a regulating voltage is superimposed on the bias voltage, with the sign of this regulating voltage depending on the output signal of the loop-measuring device.

Since, in controlling the runout stop, the diameter of the film reels on the takeup and supply reels is determined from the rpm of the individual drive motors for the supply and takeup devices and/or the winding devices, extremely rapid, controlled braking of all of the drive motors is possible and, with little expense, one can ensure for example that the film is not fully unwound from the supply reel but a remaining length is left on the supply reel; this is especially important in film editing.

One advantageous improvement of the invention is characterized by the fact that with a common drive motor for the supply and takeup devices operated in opposite rotational directions, said motor is connected with a sensor device to detect the rpm, the output signal of this device being supplied together with output signals from the sensor devices connected with the winding motors, to a comparison device, said device delivering a signal to the higher-order control device to brake all the drive motors when a presettable value of the rpm difference between the drive motor for the supply and takeup devices and one of the winding motors is exceeded.

This improvement makes it possible, with low circuit cost, to have an effective rpm comparison between the drive motors of the supply and takeup devices and the winding devices for the winding plates.

In another advantageous design of the invention, a higher-order microprocessor-controlled control, regulating, and monitoring system as well as electronic control and regulating components are provided for controlling the individual components of the film projector, with the microprocessor receiving all the output signals from the sensor devices and, when a presettable rpm is exceeded or when a direction of rotation differs from the direction of rotation specified for the corresponding drive motor, all the drive motors stop. This design for the control and regulating device results in a minimum circuit cost with maximum dynamics of the individual control circuits and maximum possible protection against malfunctions.

Advantageous improvements of the invention are characterized in the subclaims or will be described in greater detail below with reference to the description of the preferred embodiment of the invention, with reference to the Figures.

Figure 1:
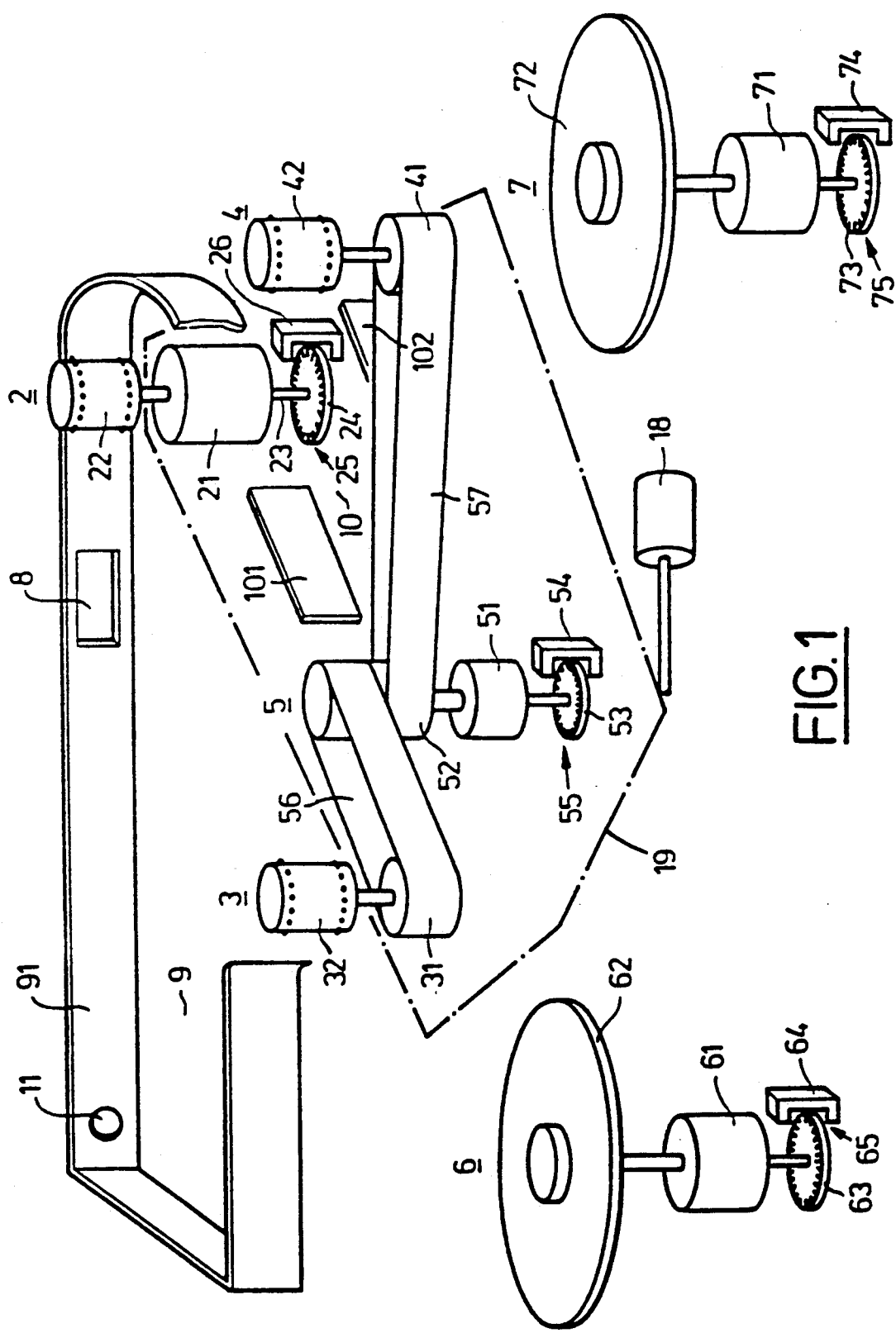
FIG. 1 is a schematic perspective view of the individual film transport parts.

The schematic perspective view shown in FIG. 1 of the important drive parts of the film projector according to the invention shows film transport device 2, supply and takeup devices 3 and 4, driven by a common drive device 5, the winding devices 6, 7 supporting the film reels, and, in a simplified schematic perspective view, the film loop channels 9, 10 provided on both sides of film gate 8 to receive the film loops.

Film transport device 2 includes a main motor 21 consisting of a high-dynamic DC servo motor transmitting its rotary motion to film 1 through a directly driven film sprocket 22. Main motor 21 is permanently linked by a shaft 23 with a phase-angle sensor disk 24 of a sensor 26 to determine the exact position of main motor 21 by means of an optoelectronic position-scanning device 25, and passes it on.

Supply and takeup devices 3 and 4 include a drive shaft 31, 41, permanently connected with sprockets 32 and 42 respectively, and transporting the inserted film continuously. Drive shafts 31 and 41 are connected by belts 56 and 57 with drive rollers 52 of drive device 5, coupled rigidly by a shaft to a drive motor 51, consisting of a regulated DC motor, whose rpm is regulated in proportion to the set frame frequency A phase angle sensor disk 53 permanently attached to the motor shaft is used to detect the rpm and position of drive motor 51, said disk, together with an optoelectronic scanning device 54, forming a sensor 55.

Winding devices 6 and 7 for receiving film reels include winding plates 62 and 72 each connected by a shaft with a winding motor 61 or 71 designed as a DC motor. A phase angle sensor disk 63 or 73 permanently attached to the shaft of the corresponding winding motor 61 or 71 is used to detect the rpm and rotational direction of winding motors 61 and 71, said disk together with an optoelectronic scanning device 64, 74, forming a sensor device 65, 75.

Film loop channels 9 and 10 serve to receive the film loops formed on both sides of film gate 8, while in the present case, because of the special design of the control and regulating device and the mechanical coupling, only one loop-measuring device 11 is provided in film loop channel 9 located to the left of film gate 8. Loop-measuring device 11 can consist of a reflecting light barrier or an LED combined with a phototransistor opposite.

An adjusting slide 19 mounted in suitable guides is driven by an adjusting motor 18 and carries the imaging optics, film transport device 2 including a film platform with film pressure plate, supply and takeup devices 3 and 4, pivot skid 33, and drive device 5.

Figure 2:
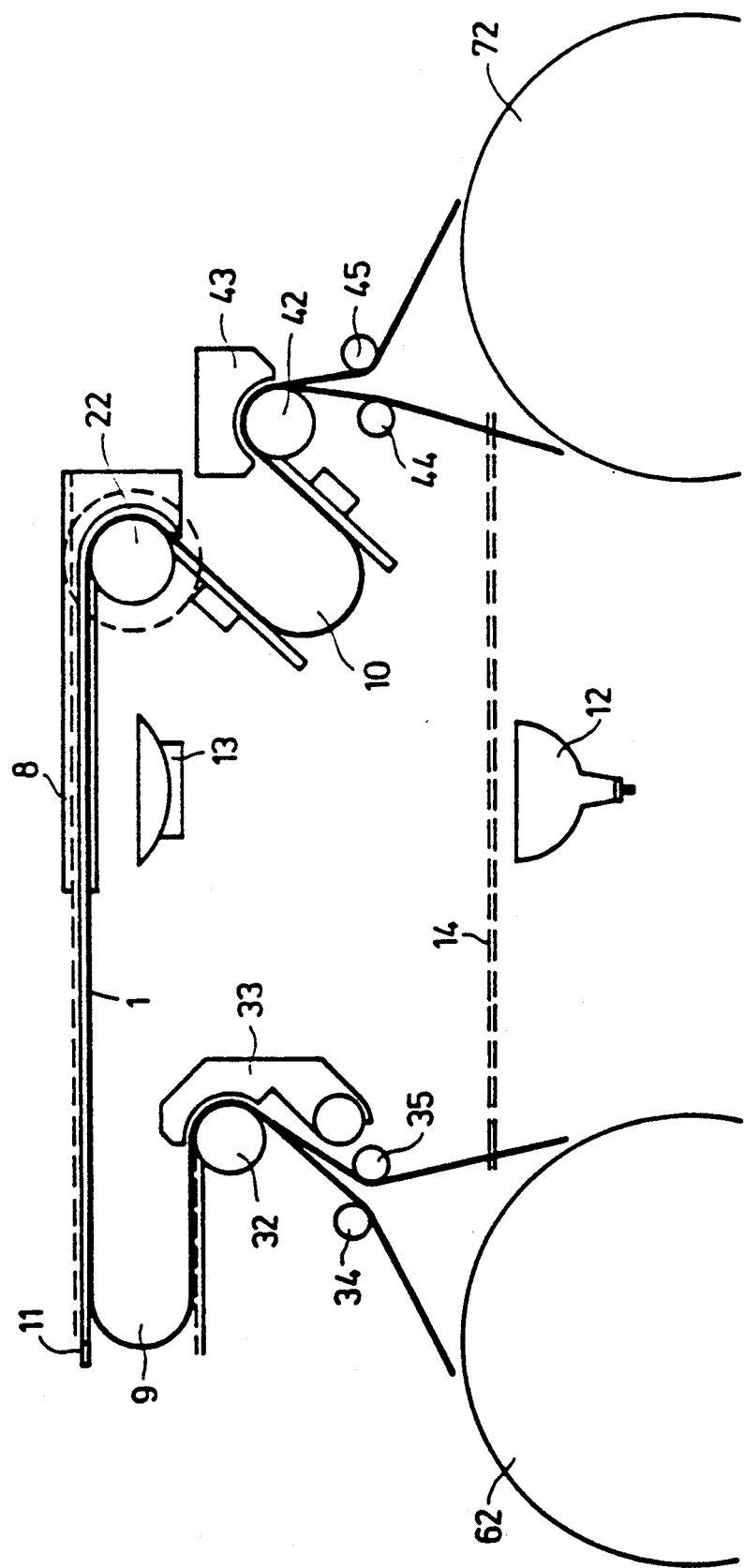
FIG. 2 is a top view of a film projector with film loops formed on both sides of the film gate.

The top view shown in FIG. 2 of a film projector shows the film transport path, the arrangement of the individual parts of the film channel and the drive parts, as well as the formation of film loops in the film loop channels, with the parts corresponding to those shown in FIG. 1 having the same reference numbers as in the perspective view in FIG. 1.

At the same time, this top view shows the different winding directions of winding plates 62 and 72, with the so-called outside winding being shown in solid lines while the so-called inside winding is shown by dashed lines.

Winding plates 62 and 72 serve to receive the film reels with the film optionally being unwound from left-hand winding plate 62 and moved through the film channel described below to right winding plate 72 or vice versa. Depending on the user's wishes, film 1 can also be placed simply on winding plate 62, 72, as indicated in FIG. 2 by the different film paths.

Two guide posts 34 and 35 abut left-hand winding plate 62, said posts guiding film 1 between sprocket 32 of left-hand supply and takeup device 3 and a pivot skid 33. Similarly, two guide posts 44 and 45 are provided in the vicinity of right-hand winding plate 72, said posts guiding the film between sprocket 42 of the right-hand supply and takeup device and a pressure skid 43. Pivot skid 33 and pressure skid 43 have inner surfaces whose curvatures match the diameters of sprockets 32 and 42 so that film 1 is tensioned and lies closely against the corresponding sprocket 32 or 42.

Film gate 8 and film transport device 2 with film sprocket 22 are located between the supply and takeup devices 3 and 4. Film gate 8 is part of a film contact rail 80 having a curved film skid 81 in the vicinity of film sprocket 22, the curvature of said skid likewise matching the diameter of film sprocket 22.

A pressure platform 85 spring-mounted in a film platform, fits between the teeth of film sprocket 22 and, when the film channel is closed, fits tightly against film 1, pressing said film against film contact rail 80, so that the film travels past gate 8 without any lateral deflection, ensuring a smooth transition to film sprocket 22.

A left film loop channel 9 is provided between left sprocket 32 and gate 8, said channel being formed by parallel channel walls 91 and 92. Similarly, a right-hand film loop channel 10 is formed between film transport device 2 and film sprocket 22 and right-hand sprocket 42, said channel being formed by two parallel channel walls 101 and 102 abutting film sprocket 22 or right-hand sprocket 42.

The light source is a projection lamp 12 serving to project the frame in front of gate 8 onto a rear projection hood or onto a screen in conjunction with an optical device 13. A rotating diaphragm shutter or rotating diaphragm mirror 14 is provided between projection lamp 12 and optical device 13.

Film transport device 2, film pressure plate 85, supply and takeup devices 3 and 4, and film loop channel walls 101 and 102 are jointly mounted, together with imaging optics 13, on an adjusting slide 19, said slide being moved by adjusting motor 18 shown in FIG. 1 to close the film channel.

The film unwound from left-hand winding plate 62 or taken up thereon is guided by one of guide posts 34 or 35 to the lefthand sprocket 32 of supply and takeup device 3, where it is pressed against sprocket 32 by a pivoting skid 33. Then film 1 enters film loop channel 9 located to the left of gate 8 and from there moves past gate 8 to film sprocket 22 of the film transport device.

Film loop channel 10, located to the right of gate 8, is provided between film sprocket 22 of film transport device 2 and sprocket 42 of downstream supply and takeup device 4, said channel uncoupling, in a stepped drive mode, the stepwise film feed motion in the vicinity of the gate from the continuous film movement of supply and takeup device 4. A pressure skid 43 is provided to press film 1 against sprocket 42 of supply and takeup device 4, against which skid sprocket 42 rests when the film channel is closed.

Moving past one of guide posts 44 or 45, the film reaches right-hand winding plate 72 of corresponding winding device 7.

Figure 3:
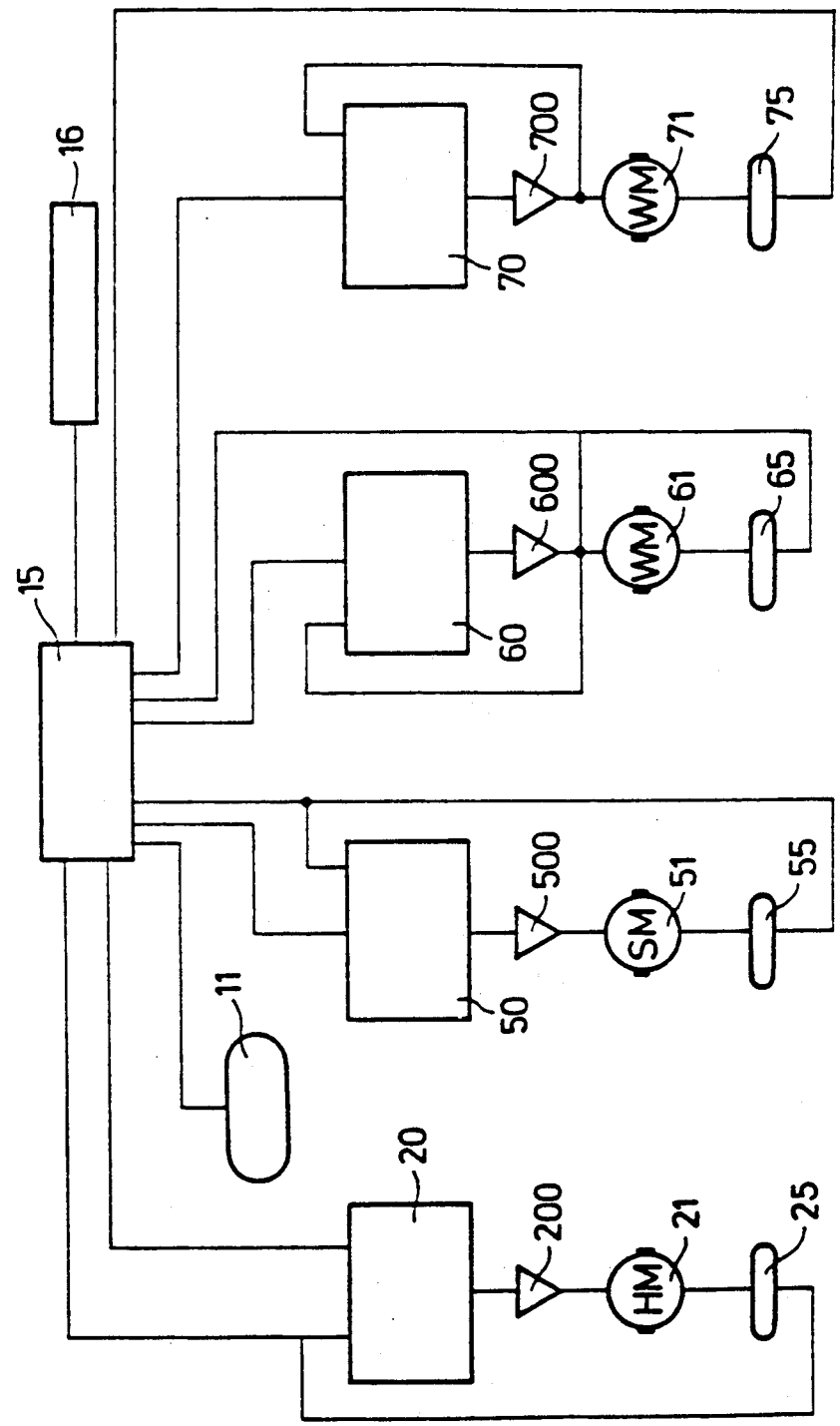
FIG. 3 is a simplified block diagram of the control and regulating device for the film projector.

FIG. 3 is a simplified block diagram of the control and regulating device according to the invention for the film transport parts shown in FIGS. 1 and 2.

Higher-order control, regulating, and monitoring system 15 is connected with an entry keyboard 16 for entering desired film projector functions such as frame transport at variable transport speeds, search, fast forward and fast rewind, or the like. Preferably it has a microprocessor connected with a memory for storing any desired functions of the film projector.

Higher-order control, regulating, and monitoring system 15 is connected on the output side with electronic control and regulating parts 20, 50, 60, 70 for the individual drive elements of the film projector. The outputs of electronic control and regulating parts 20, 50, 60, and 70 are connected by downstream DC power amplifiers 200, 500, 600, and 700 with main motor 21 of film transport device 2, drive motor 51 of drive device 5, and left-hand winding motor 61 and right-hand winding motor 71 of the two winding devices 6 and 7. Position sensors 25 and 55 of main motor 21 and drive motor 51, coupled to the motor shafts, provide the corresponding position, rpm, and/or rotational direction signals to the inputs of associated control and regulating parts 20 and 50 and to the higher-order control, regulating, and monitoring system. Angle indicator disks 63, 73 of position sensors 65 and 75 coupled to the motor shafts of winding motors 61 and 71 deliver output signals, each exclusively feeding to one input of higher-order control, regulating, and monitoring system 15.

In addition, the outputs of DC power amplifiers 600 and 700 are connected to one input of associated control and regulating parts 60 and 70.

The signal emitted from loop-measuring device 11 is likewise fed to one input of control, regulating, and monitoring system 15.

The function of the control and regulating device according to the invention during the transition from intermittent frame transport will all possible forms of projection, to continuous high speed operation and vice versa will now be described. with reference to the figures described above. The frame frequency entered from the keyboard is converted by higher-order control, regulating, and monitoring system 15 into an rpm setpoint for control and regulating part 50 of drive device 5, so that the rpm of drive motor 51 is regulated in proportion to the frame frequency setting. The film loops formed in film loop channels 9 and 10, once set, remain essentially constant. Any deviation that may occur is detected by loop-measuring device 11, and a corresponding signal is sent to control and regulating part 50 to increase or decrease the rpm of drive motor 51 depending on the change in the film loop measured in film loop channel 9.

Alternatively, in a preferred embodiment of the invention, the rpm is regulated directly in higher-order control, regulating, and monitoring system 15.

The drive torque of winding motors 61 and 71 of left-hand and right-hand winding devices 6 and 7 respectively are regulated to keep the film reel tightness nearly constant. For this purpose, the diameter of the film supply on the left-hand or right-hand film reel is determined from the ratio of the rpm of respective winding motor 61 or 71 to drive motor 51 of drive device 5, and the corresponding motor torque setting is higher-order control, regulating, and monitoring system 15 and passed to regulating parts 60 and 70 as a set value. The current required in each case is supplied to winding motors 61 and 71 through regulating amplifiers 600 and 700 connected downstream.

If a frame frequency different from the current frame frequency or a rewind or search command is entered from keyboard 16, a transitional phase is inserted by higher-order control, regulating, and monitoring system 15 within the framework of the following frame frequency switch, said phase producing a rapid but continuous change in the rpm of drive motor 51 of drive device 5 and hence of supply and takeup devices 3 and 4. This creates the conditions necessary to ensure correct film tension on the film reels even in the transitional phases.

When projection speed changes, additional torque is applied to winding motors 61 and 71 to apply the necessary accelerating or decelerating energy and maintain the required film tension.

To change frame frequency during projection and in the rapid and continuous fast forward, reverse, and search modes, the speed or rpm of common drive motor 51 for supply and takeup devices 3 and 4 is continuously increased or decreased during the transitional phase, while the film loops are controlled by film transport device 2 or main motor 21. This switch of film loop regulation from supply and takeup device 3, 4 to main motor 21 is performed by the higher-order control, regulating, and monitoring system.

The film loops are regulated during frame frequency changes, depending on the sign of the signal from loop-measuring device 11, by adding or subtracting film transport steps. This transitional phase ends when the supply and takeup drives have reached the correct rpm for the new film speed. At this point in time, film loop regulation is returned to the supply and takeup device.

During continuous transport, the film loops are regulated at constant film speed in the forward, reverse, and search modes and in the transitional phases by film transport device 2 or by main motor 21.

The loops are regulated during continuous transport, in other words in the fast forward, reverse, and search modes, by a certain regulating voltage being superimposed on the bias voltage of main motor 21, said regulating voltage being proportional to the rpm of supply and takeup devices 3 and 4, and the sign of said regulating voltage being determined by loop-measuring device 11, so that the film loops formed in film loop channels 9 and 10 can be kept constant by increasing or reducing the rpm of main motor 21 of film transport device 2.

Film loop regulation during continuous transport is likewise switched by the higher-order control, regulating and monitoring system.

With continuous transport during a change in frame frequency, the film loops formed in film loop channels 9 and 10 are kept constant by increasing or reducing the rpm of main motor 21 of film transport device 2.

For rewinding or rapidly finding certain places in the film, a very convenient fast-wind device is provided which makes it possible, by pressing keys on keyboard 16, to switch immediately from any projection speed to high speed, in other words, to move from stepwise frame transport immediately to continuous frame transport and back again to the desired projection frequency.

The function of the control and regulating device according to the invention during or after closure of the film channel and during runout stop will be described in greater detail below with reference to the figures described above.

During or shortly after closure of the film channel, all of the sensors connected with the drive motors are interrogated, and the rotational direction of the winding motors is thus determined. From the rotational direction of the winding motors, a determination is made whether inside or outside winding is present, and the winding motors are regulated accordingly. By appropriately setting the acceptable rotational directions, it can be determined whether one of the winding motors is turning in the wrong direction, so that either the rotational direction can be reversed or the drive motors stopped.

Alternatively, the correct winding direction can be determined by measuring the rpm, since a drive motor turning in the wrong direction will run too fast because of the low load, so that when a relatively low maximum rpm is specified by the higher-order control, regulating, and monitoring system, exceeding this rpm stops the drive motors or reverses the rotational direction of the drive motor in question.

In both cases, the signals output by the sensors are passed on to higher-order microprocessor-controlled control, regulating, and monitoring system 15, which links the signals received and the control commands entered from keyboard 16, and in the event of unacceptable operating states, for example if the film is improperly fed, the film projector is stopped by shutting off the drive motors.

Preferably, the winding direction is determined during closure of the film channel or during loop formation, whereupon the drive motors for the winding plates are controlled accordingly without the drive motors being stopped. The information on the corresponding winding direction is stored until the film channel is opened again.

The runout stop is effective both during intermittent film transport and during continuous film transport for rewinding or rapid searching. The rpm-proportional signals output by the sensors make it possible to determine very precisely the diameter of the film supply on the supply or takeup reel in comparison to the rpm of the supply and takeup devices.

If the film has been unwound completely from the supply reel, the drive motors are stopped in a controlled fashion so that the length of film remaining in the film channel is taken up on the takeup reel and then all the drive motors are stopped. Since the supply reel is controlled to produce a constant film winding action, when the film is completely unwound there is an immediate difference in rpm between the winding motor of the supply reel and the drive motor of the supply and takeup device. A dynamic braking process initiated by higher-order microprocessor-controlled control, regulating, and monitoring system 15 causes the film to be pulled completely out of the film channel by the takeup reel; after the end of the film has left the film channel, the takeup motor is stopped as well.

Figure 4:
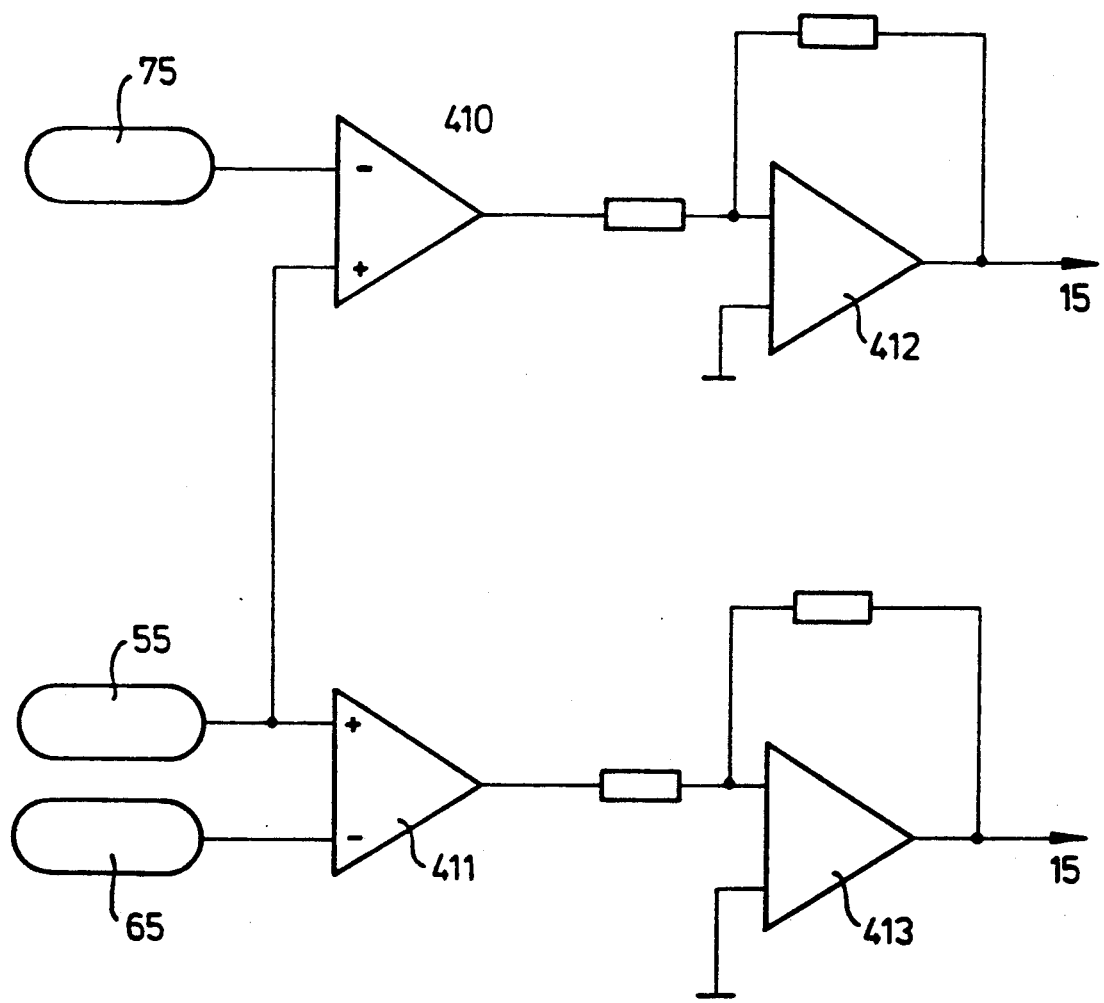
FIG. 4 is a schematic of the comparison device.

FIG. 4 shows an embodiment of the control part for determining the diameter of the film supplies on the supply and takeup reels for controlling the runout stop.

The output signal of sensor 55 for the drive motor of the supply and takeup device is connected to the positive inputs of two comparators 410, 411, whose negative input is supplied by the output signals of sensor devices 65 and 75 of the right-hand and left-hand winding devices. The outputs of comparators 410 and 411 are connected to one input of Schmitt triggers 412 and 413 to adjust a presettable threshold value for the rpm difference between the drive motors of the supply and takeup devices and the drive motors of the left-hand and right-hand winding devices.

The output signals of Schmitt triggers 412 and 413 are connected to inputs of higher-order microprocessor-controlled operating and monitoring system 15, so that when a presettable rpm difference from operating and monitoring system 15 is exceeded, a control signal is issued to stop the drive motors.

The invention is not limited in its embodiments to the preferred embodiment described above. Rather, a number of variations are possible that employ the solution shown in very different ways. In particular, the embodiment is not limited to construction using discrete logical modules, but can advantageously also be accomplished with programmed logic, preferably using a microprocessor.

We claim:

1. A film projector comprising film gate structure, two winding plates arranged on both sides of said film gate structure, two winding motors, each said winding motor being coupled in driving relation to a corresponding one of said winding plates, supply and takeup devices located between said winding plates and said film gate structure to create film loops on both sides of said film gate structure, a common motor coupled in driving rotation to said supply and takeup devices, a first regulator for said common motor, the rpm of said common drive motor being regulated by said first regulator during intermittent film transport in proportion to a preset frame frequency, a film transport device located between said supply and take up devices, a loop sensor for sensing the film loop formed between said supply and takeup devices and said film gate structure, and emitting a loop signal, a second regulator for said film transport device, and a control system for processing the control and measurement signals, said control system, during intermittent film transport, being adapted to supply settings to said first and second regulators for more rapid fast forward, reverse, and search modes, and for changing frame frequency.

2. A film projector according to claim 1 wherein said control system maintains intermittent operation for changing frame frequency during image projection in a transitional phase, the rpm of the common drive motor of the supply and takeup devices being continuously increased or decreased, and continuous film transport being provided in said fast forward, reverse, and search modes, and with the film loops being regulated by said film transport device both during said transitional phase and during constant high-speed operation.

3. A film projector according to claim 1 or 2 and further including circuitry for adding or omitting diaphragm-synchronized frame step control pulses during the transitional phase as a function of the output signal of said loop sensor.

4. A film projector according to claim 2 and further including circuitry for applying a bias voltage proportional to the rpm of said supply and takeup devices to said film transport device during continuous film transport, and for superimposing of regulating voltage on said bias voltage, the sign of said regulating voltage depending on said loop signal of said loop sensor.

5. A film projector according to claim 1 and further including circuitry for regulating the drive torque of said winding motors to keep the film reel tightness approximately constant over the entire diameter range o said film reels, the corresponding reel diameter being derived from the ratio of the rpm values of the respective winding motors and said common drive motor of said supply and takeup devices, and circuitry for delivering to said winding motors through a downstream regulating amplifier, the current necessary to produce said drive torque.

6. A film projector according to claim 5 and further including circuitry for applying additional torque at the beginning of a speed change during continuous film transport, in order to maintain appropriate film tension.

7. A film projector according to claim 1 wherein said film transport device drive motor, said common drive motor of said supply and takeup devices, and said winding motors are each connected with a sensor for detecting the rotational angles of the motors, the output signals of said sensors being supplied to said control system and only one loop sensor is provided between one of said supply and takeup devices and said film gate structure to regulate one film loop, while the other film loop is entrained.

8. A film projector according to claim 5 wherein the drive shafts of said drive motors are connected with phase-angle sensors, the output signals of said phase-angle sensors delivering phase angle, rpm, and rotational direction data of said drive motors to their individual regulators and to said control system.

9. A film projector according to claim 1 and further including an entry keyboard and wherein said control system is connected on the input side with said entry keyboard and on the output side with the inputs of said drive motor regulators wherein said first and second regulators additionally receive the loop signal output of said loop sensor, and said loop signal is supplied to said control system.

10. A film projector according to claim 8 wherein output signals of said phase angle sensors indicate winding direction during closure of the film channel and means for storing said winding direction information until the next opening of the film channel, said winding motors being controlled accordingly, and said common drive motor of said supply and takeup devices being connected to an rpm sensor, the output signal of said common drive motor sensor being supplied, together with the output signals of sensors connected to said winding motors to a comparator which, when a presettable value of the rpm differential between said common drive motor and one of said winding motors is exceeded, sends a signal to said control system for braking all of said drive motors.

* * * * *